(12) United States Patent
Jiang et al.

(10) Patent No.: US 8,301,602 B1
(45) Date of Patent: Oct. 30, 2012

(54) DETECTION OF INCONSISTENCIES IN A FILE SYSTEM

(75) Inventors: Xiaoye Jiang, Shrewsbury, MA (US); Ajay Potnis, Kothrud (IN); Mrinalini Chavan, North Chelmsford, MA (US); Sairam Iyer, South Grafton, MA (US); John Hayden, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 520 days.

(21) Appl. No.: 12/113,530

(22) Filed: May 1, 2008

(51) Int. Cl.
*G06F 7/00* (2006.01)

(52) U.S. Cl. .......................... 707/649; 707/691

(58) Field of Classification Search .............. 707/646, 707/649, 648, 823, 690–692, 675, 677
See application file for complete search history.

(56) References Cited

U.S. PATENT DOCUMENTS

| | | |
|---|---|---|
| 6,434,681 B1 | 8/2002 | Armangau |
| 6,792,518 B2 | 9/2004 | Armangau et al. |
| 6,895,413 B2 * | 5/2005 | Edwards .......................... 1/1 |
| 6,934,822 B2 | 8/2005 | Armangau et al. |
| 7,373,364 B1 * | 5/2008 | Chapman .......................... 1/1 |
| 7,409,414 B2 * | 8/2008 | Okada et al. .................. 707/648 |
| 7,689,599 B1 * | 3/2010 | Shah et al. ...................... 714/19 |
| 7,900,088 B1 * | 3/2011 | Pawar et al. .................... 714/21 |
| 2003/0159007 A1 * | 8/2003 | Sawdon et al. ............... 711/154 |
| 2005/0182797 A1 * | 8/2005 | Adkins et al. ................. 707/200 |
| 2006/0212481 A1 * | 9/2006 | Stacey et al. ................. 707/104.1 |
| 2006/0282471 A1 * | 12/2006 | Mark et al. .................... 707/200 |
| 2007/0050576 A1 * | 3/2007 | Suzuki .......................... 711/162 |
| 2008/0222078 A1 * | 9/2008 | Godbole .......................... 707/1 |

OTHER PUBLICATIONS

Sobell, Mark G. A practical Guide to Red Hat® Linuc® 8 [online]. Addison-Wesley Professional, Dec. 2002 [retrieved on Jul. 26, 2010]. Retrieved from the Internet<URL:http://proquest.safaribooksonline.com/0-201-70313-0> 54 selected pages.*

McKusick, Marchall K. Running "fsck" in the Background. BSDCon '02 Conference on File and Storage Technologies [online]. Feb. 2002 [retrieved on Jul. 25, 2010]. Retrieved from the Internet<URL:http://www.usenix.org/event/bsdcon02/mckusick/mckusick_html> 14 Pages.*

McKusick Marshall K. "Soft Updates: A Technique for Eliminating Most Synchronous Writes in the Fast Filesystem". Jun. 1999. Proceedings of the FREENIX Track: 1999 USENIX Annual Technical Conference. 18 Pages.*

* cited by examiner

*Primary Examiner* — James E Richardson
(74) *Attorney, Agent, or Firm* — Muirhead and Saturnelli, LLC

(57) ABSTRACT

Described are techniques for correcting at least some inconsistencies in a file system accessed by at least one client, while maintaining the file system online. A file system checking utility is executed on the file system to detect and create corrections for inconsistencies in the file system. The file system is updated to include at least some corrections. Also described is a computer system comprising a file system accessed by a client. A file system checking utility is executed on the file system to detect at least some inconsistencies in the file system, and to create a corrected version of the file system that includes corrections to correct for at least some of the detected inconsistencies. A report is created. The file system is not updated with the corrected version unless the proposed corrections are approved. The file system checking utility may be periodically scheduled for execution.

59 Claims, 10 Drawing Sheets

BLOCK MAP

| CLONE VOLUME | SAVE VOLUME |
|---|---|
| B0 | S100 |
| B1 | S50 |
| B2 | --- |
| B3 | S230 |
| . | . |
| . | . |
| . | . |

FIG. 5

DETECTION OF INCONSISTENCIES IN A FILE SYSTEM

FIELD OF INVENTION

The present invention relates generally to the management of file systems, and more particularly to the detection and correction of inconsistencies in a file system.

DISCUSSION OF RELATED ART

The availability of affordable large-scale data storage systems has spawned an era where storing large quantities of data is commonplace. While many enterprises desire to retain large quantities of data, management of large data sets has become a challenging endeavor. In some cases, hundreds or thousands of clients may access a shared file system on a given day, and each may add, delete, and/or modify multiple files in the system. Inconsistencies sometimes develop in a file system for any of a number of reasons (e.g., corruption of the file system metadata). For example, file system corruption may occur when multiple pieces of the file system are written to complete an activity. While one piece is written to but other pieces are yet to be updated, a transient state exists. If the activity is not fully completed for any reason (e.g., because of a power failure or unauthorized shutdown) and the transient state persists, proper functioning of the file system is not assured.

One prior method for dealing with file system corruption or inconsistencies involved making one or more backup copies of the file system. In the event that the primary file system should fail in some regard, the primary file system could be restored with one of the backup copies that was made before the corruption occurred.

In another prior alternate approach, the primary file system could be taken offline and a file system maintenance tool (e.g., performing a file system check) could be executed on the file system to detect any inconsistencies.

SUMMARY

One illustrative embodiment of the invention is directed to a method of correcting at least some inconsistencies in a file system accessed by at least one client. The method comprises acts of: (A) while maintaining the file system online for access by the at least one client, executing at least one file system checking utility on the file system to detect and create corrections for at least some inconsistencies in the file system, and (B) updating the file system to include at least some of the corrections.

Another illustrative embodiment of the invention is directed to a method for use in a computer system comprising a file system accessed by at least one client. The method comprises acts of: (A) executing at least one file system checking utility on the file system to detect at least some inconsistencies in the file system and to create a corrected version of the file system that includes at least some corrections to correct for at least some of the detected inconsistencies, (B) creating a report that identifies the proposed corrections in the corrected version of the file system, and (C) refraining from automatically updating the file system with the corrected version unless the proposed corrections are approved.

A further illustrative embodiment of the invention is directed to a method of proactively and prophylactically maintaining integrity of a file system accessed by at least one client. The method comprises acts of: (A) scheduling execution of at least one file system checking utility to detect and correct at least some inconsistencies in the file system based upon a schedule that is selected to periodically check the integrity of the file system and correct at least one inconsistency so that the at least one file system checking utility is executed not in response to one or more file system problems being detected by the at least one client.

Another illustrative embodiment of the invention is directed to a computer readable medium encoded with a plurality of instructions that, when executed, perform a method of correcting at least some inconsistencies in a file system accessed by at least one client. The method comprises acts of: (A) while maintaining the file system online for access by the at least one client, executing at least one file system checking utility on the file system to detect and create corrections for at least some inconsistencies in the file system, and (B) updating the file system to include at least some of the corrections.

A further illustrative embodiment of the invention is directed to a computer readable medium encoded with a plurality of instructions that, when executed, perform a method for use in a computer system comprising a file system accessed by at least one client. The method comprises acts of: (A) executing at least one file system checking utility on the file system to detect at least some inconsistencies in the file system and to create a corrected version of the file system that includes at least some corrections to correct for at least some of the detected inconsistencies, (B) creating a report that identifies the proposed corrections in the corrected version of the file system, and (C) refraining from automatically updating the file system with the corrected version unless the proposed corrections are approved.

Another illustrative embodiment of the invention is directed to a computer readable medium encoded with a plurality of instructions that, when executed, perform a method of proactively and prophylactically maintaining integrity of a file system accessed by at least one client. The method comprises acts of: (A) scheduling execution of at least one file system checking utility to detect and correct at least some inconsistencies in the file system based upon a schedule that is selected to periodically check the integrity of the file system and correct at least one inconsistency so that the at least one file system checking utility is executed not in response to one or more file system problems being detected by the at least one client.

A further illustrative embodiment of the invention is directed to at least one computer for use in a computer system comprising a file system accessed by at least one client. The at least one computer comprises at least one processor programmed to, while maintaining the file system online for access by the at least one client, execute at least one file system checking utility on the file system to detect and create corrections for at least some inconsistencies in the file system, and update the file system to include at least some of the corrections.

Another illustrative embodiment of the invention is directed to at least one computer for use in a computer system comprising a file system accessed by at least one client. The at least one computer comprises at least one processor programmed to, execute at least one file system checking utility on the file system to detect at least some inconsistencies in the file system and to create a corrected version of the file system that includes at least some corrections to correct for at least some of the detected inconsistencies, create a report that identifies the proposed corrections in the corrected version of the file system, and refrain from automatically updating the file system with the corrected version unless the proposed corrections are approved.

A further illustrative embodiment of the invention is directed to at least one computer for use in a computer system comprising a file system accessed by at least one client. The at least one computer comprises at least one processor programmed to proactively and prophylactically maintain integrity of the file system by scheduling execution of at least one file system checking utility to detect and correct at least some inconsistencies in the file system based upon a schedule that is selected to periodically check the integrity of the file system and correct at least one inconsistency so that the at least one file system checking utility is executed not in response to one or more file system problems being detected by the at least one client.

BRIEF DESCRIPTION OF THE DRAWINGS

Aspects of the invention are described with reference to illustrative embodiments and the following drawings in which like numerals reference like elements, and wherein:

FIG. 5 shows a representation of a block map used by the checkpoint facility of FIG. 4.

DETAILED DESCRIPTION

Figure 1:
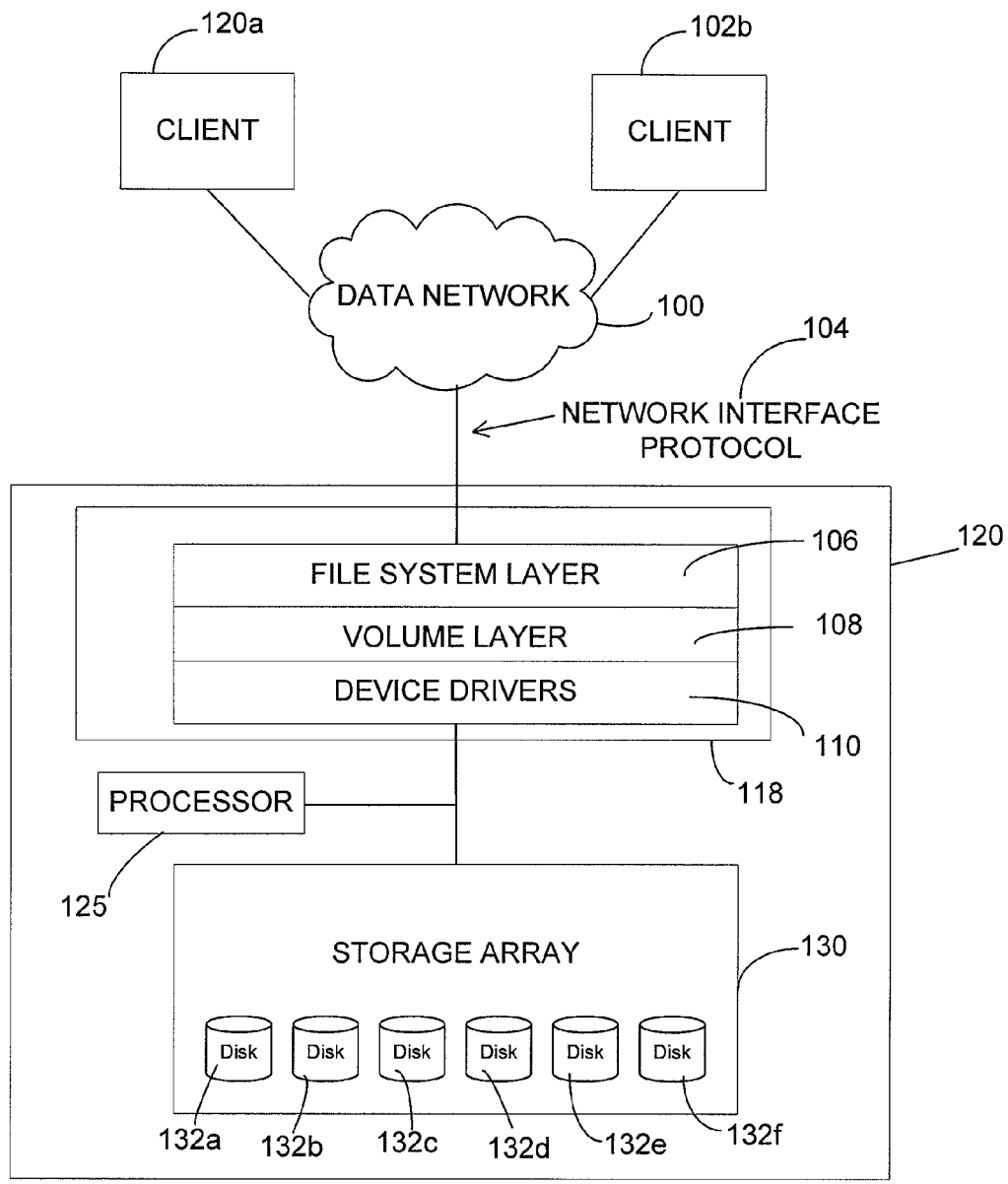
FIG. 1 is a block diagram of a data computer system on which embodiments of the present invention can be implemented.

As mentioned above, the integrity of file systems may be assessed and inconsistencies therein corrected using existing file system utilities. An example of such a utility is the well known UNIX-based file system utility FSCK that performs a file system check. Existing file system utilities (e.g., FSCK) must execute on a static copy of the file system. Thus, conventionally the file system needed to be taken offline to enable the integrity of the file system to be checked and to have any inconsistencies corrected. However, checking the integrity of a file system often conventionally takes several hours or days depending on the size of the file system and the extent of the corruption. Given the significant down time to execute a file system utility to detect and correct any inconsistencies in the file system, Applicants have appreciated that system administrators are hesitant to take a file system offline to perform such maintenance and often do so only after significant problems are detected (e.g., by a user unable to access files) with the file system.

In accordance with some embodiments of the present invention, online access to a file system is maintained for access by one or more clients while the integrity of the file system is checked, and at least some inconsistencies in the file system are detected and corrected. This can be performed in any suitable manner. In accordance with some embodiments, the integrity of a file system is checked by executing a file system checking utility on an offline copy of the file system which represents the state of the primary file system at the time when the offline copy was created. In some further embodiments of the present invention, updates to the primary file system that have occurred since the creation of the offline copy are taken into consideration before the corrected offline copy is used to update the primary file system to incorporate at least some of the corrections performed by the file system utility.

By enabling a file system to be maintained online while it is checked for inconsistencies, and corrections are generated for any detected inconsistencies, new paradigms are possible relating to the ways in which file system checks are performed. In accordance with one embodiment of the present invention, the integrity of a file system may be proactively and prophylactically maintained by executing one or more file system checking utilities to detect and correct any inconsistencies in the file system before problems in the file system are detected by the users. As discussed above, in accordance with conventional practice, file system checking utilities are executed only after users begin to experience problems with the file system, and the problems are severe enough to warrant taking the file system offline to perform a file system check. In accordance with some embodiments of the present invention that enable the file system to be maintained online while a file system checking utility is performed thereon, greater flexibility is provided so that a file system checking utility can be executed at times other than in response to complaints from a user. For example, the file system checking utility can be executed on the file system at any time to detect and correct problems before they manifest themselves in a user's experience. In accordance with one embodiment of the present invention, execution of at least one file system checking utility can be scheduled to be performed on the file system at any desired time or periodically at any interval to proactively and prophylactically maintain the integrity of the file system.

In accordance with another embodiment of the present invention, after a file system checking utility is performed to detect inconsistencies in the file system and provide corrections therefor, a report can be created that identifies the proposed corrections to be made to the file system. Applicants have appreciated that such a report may be advantageous to enable an individual (e.g., a system administrator) to examine the proposed corrections before they are actually implemented in the primary file system, thereby allowing the individual to make an informed decision as to the desirability of making the corrections. Thus, in accordance with one embodiment of the present invention, a file system checking utility is executed on a file system to detect at least some inconsistencies therein and to create a corrected version that includes at least some corrections, a report is created that identifies the proposed corrections, and the system refrains from automatically updating the primary file system with the corrected version unless and/or until the proposed corrections are approved.

It should be appreciated that the aspects of the present invention described herein can be employed in connection with any suitable file system. Thus, while some examples are described below, it should be appreciated that they are provided merely for illustrative purposes, and that the aspects of the present invention described herein are not limited to use with the specific types of file systems described below.

1. An Exemplary File System in a Network Attached Storage (NAS) Computer System

An example of a file system that can be checked in accordance with any of the embodiments of the invention described herein is the file system for a network-attached storage (NAS) system, an example of which is shown in the computer system of FIG. 1. In the computer system of FIG. 1, clients 102a and 102b are connected to a NAS system 120 via a data network 100 which may be any suitable network. The NAS system 120 includes a file server 118 that includes a file system 106 for organizing data into a hierarchical structure of files and directories and presents a file system interface that enables the clients 102a and 102b to share access to files maintained by the file system. The clients 102a and 102b can communicate with the NAS system 120 using any suitable protocol. Examples of NAS protocols typically employed include NFS for systems employing the UNIX operating system and CIFS for systems employing the Windows® operating system available from Microsoft Corporation. The NAS file system server 118 further includes a volume layer 108 for organizing storage space into logical volumes of data blocks, and device drivers 110 that provide for coupling between the NAS file system server 118, and a storage array 130 that contains multiple physical disks 132a-132f on which data in the NAS file system is stored. In this respect, it should be appreciated that the information stored in the NAS system 120 is ultimately stored on one or more physical discs in the storage array 130, but the interface presented for accessing information on the storage system is a file system interface presented by the NAS file system server 118. The NAS system 120 may additionally comprise one or more computer processors 125 for executing a series of computer instructions. For example, a series of instructions when executed on the processor 125, may modify the behavior of the NAS system 120 by initiating various actions on the storage system including but not limited to, creating a snapshot of a file system, initiating a file system check on a file system, and scheduling periodic maintenance on a file system.

It should be appreciated that NAS systems can take any of numerous forms, and are not limited to the specific configuration shown in FIG. 1. For example, while two clients 102a and 102b are shown, it should be appreciated that NAS systems can be employed with any number of client devices, from a single client to hundreds or thousands of clients. Similarly, while a single NAS file system server 118 is shown in the illustrative computer system shown in FIG. 1, it should be appreciated that some NAS systems can be implemented with multiple file system servers that either act as a distributed file system or that implement multiple separate file systems. Similarly, while a single storage array 130 is shown in FIG. 1 as the storage system that provides storage for the NAS system 120, it should be appreciated that any suitable number or types of storage systems can be employed, including storage systems that use other types of storage media rather than disk drives. Additionally, whereas the NAS system 120 in FIG. 1 comprises a processor 125, the NAS system or other suitable storage systems may not comprise a processor, and embodiments of the invention are not limited in this respect. Furthermore, it should be appreciated that any suitable communication protocol can be employed between the clients 102a and 102b and the NAS system 120, as the protocols described above are mentioned merely for illustrative purposes. In addition, while the file system server 118 in FIG. 1 includes a number of discrete layers and drivers, it should be appreciated that aspects of the present invention described herein are not limited to use with a NAS system including a file system server configured in the disclosed manner. As merely one alternative example, while the file system server 118 in FIG. 1 employs a volume layer 108 to provide increased control and flexibility in terms of managing any volumes of storage presented by the storage array (including logical unit numbers or LUNs), it should be appreciated that the aspects of the present invention described herein can be employed with NAS file system servers that do not provide such a capability.

An example of a NAS storage system of the type shown in FIG. 1 is any of the systems in the family of Celerra file server products available form EMC Corporation, and examples of a storage array 130 includes any of the CLARiiON storage systems or the SYMMETRIX storage systems, each also available from EMC Corporation. However, it should be appreciated that these are merely examples, and when the aspects of the present invention described herein are employed with a NAS system, they can be employed with any NAS system.

Furthermore, as discussed above, it should be appreciated that the file system presented by a NAS system is merely one example of a file system with which the aspects of the present invention described herein can be employed, as the present invention is not limited in this respect, and can be employed with any suitable file system.

In a computer system (e.g., the system of FIG. 1), clients may be provided full or limited access to create or modify files on the file system by a system administrator, thereby allowing the clients to read and/or write data from/to the storage system. As discussed above, widespread use of a shared file system occasionally leads to inconsistencies in the file system that can result in file system corruption. An example of such an inconsistency in the file system may be a lost or corrupted mapping between a file system index node ("inode") and the data block(s) to which it is associated, as described below.

Figure 2:
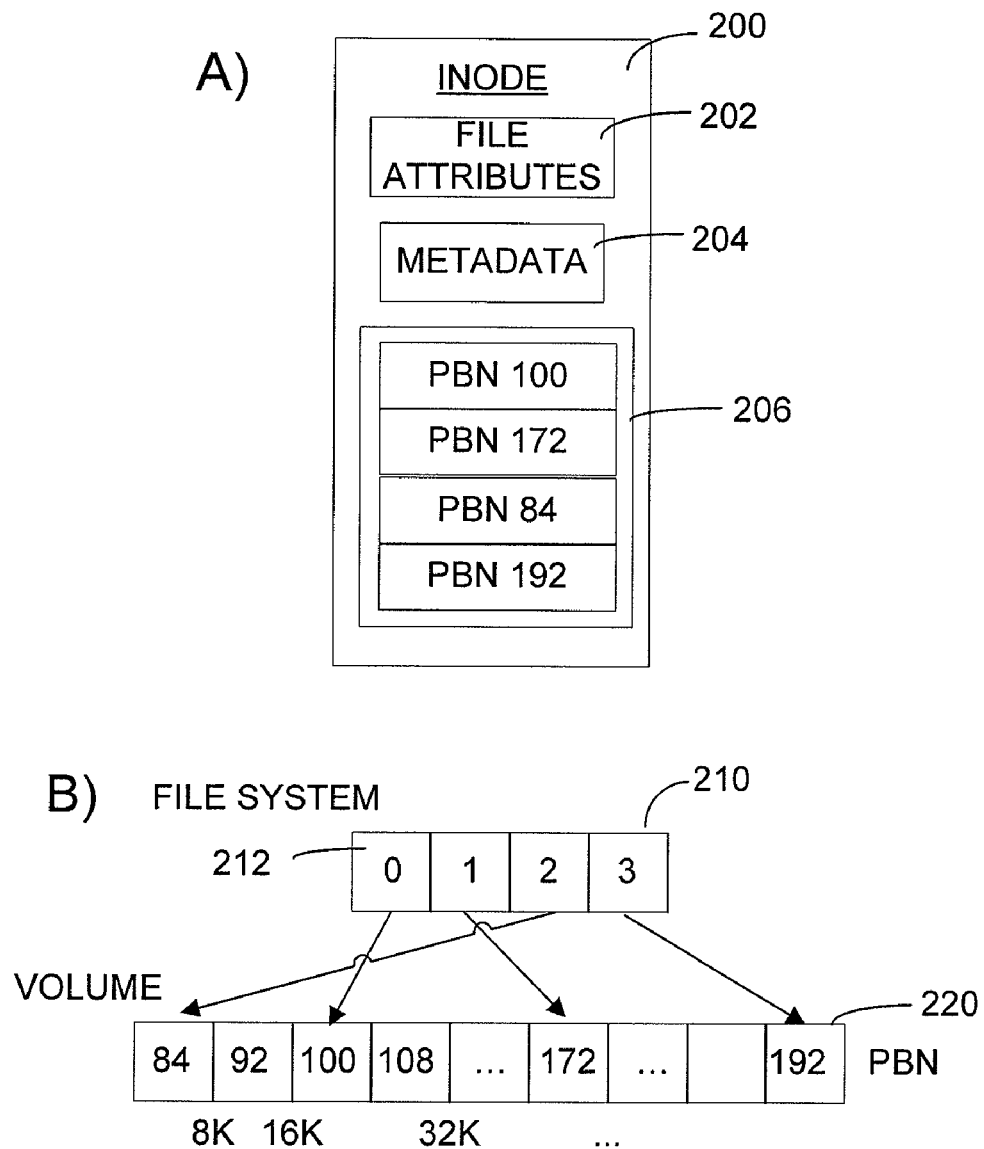
FIGS. 2a and 2b illustrate respectively a data structure and a scheme to map a file system to a volume layer employed by some file systems to which embodiments of the present invention may be employed.

In typical file systems, each file in the file system is associated with an inode 200 as shown in FIG. 2A. An inode 200 is a data structure created and maintained by the file system that typically includes file attributes 202, other metadata about the file 204, and pointers 206 to one or more physical data blocks.

In this respect, a file system typically is assigned an amount of storage space in which to store files managed by the file system and metadata that the file system employs to implement the file system. In a system such as that shown in FIG. 1, the volume layer 108 may create a single logical unit of storage (e.g., distributed among one or more Logical Unit Numbers "LUNs" presented by the storage array 130) that corresponds to the size of the storage space allocated to the file system. This file system storage space may be divided into blocks (e.g., 8K blocks or some other size), and each may be assigned a logical block number (LBN). For example, as shown in FIG. 2B, a file requiring 32 k of storage may include four logical blocks numbered 0 to 3. The logical blocks in the file system 210 point to "physical" blocks (e.g., 8 k blocks or a different size) of storage in the storage volume 220. It should be appreciated that any logical block in the file system may point to any physical block in the storage volume. Each of the blocks in the storage volume 220 has a physical block number (PBN) which represents the block's position relative to the beginning of the storage volume. Although the blocks of the storage volume 220 are referred to as physical storage blocks, it should be appreciated that in the example described above, they represent blocks in a single volume of storage created by the volume layer 108 for the file system, and that that single volume of storage may be mapped to multiple LUNs presented by the storage array 130. Depending upon the configuration of the storage array, each of the LUNs may be further mapped across one or more physical storage devices in the storage array (e.g., the disks 132a-f in FIG. 1), so that the storage volume 220 may be a logical construct rather than a physical storage device.

Figure 3:
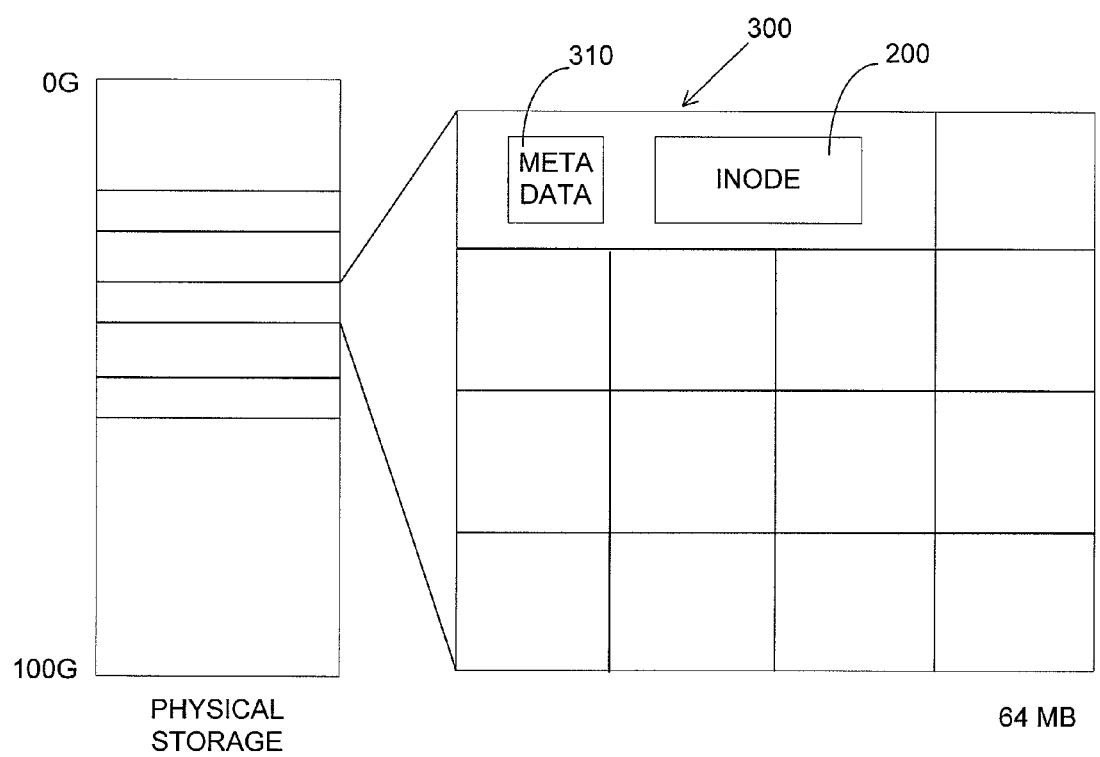
FIG. 3 is a diagram of a file system structure employed by some file systems with which embodiments of the present invention may be employed.

In typical file systems, inodes, which include the metadata for a file, are stored alongside the data that comprises the content of the file in the physical storage media in the storage system (e.g., storage array 130). As such, the physical storage devices store both the data itself and the file system metadata that is related to it. For example, some file systems can divide the file system storage space into cylinders 300 that contain a certain amount of storage, e.g., 64 MB of storage space as shown in FIG. 3. Furthermore, each cylinder is managed to track the physical blocks within it that are free or already allocated and the inode structures that are free or already allocated. Thus, each cylinder includes a cylinder group map block containing metadata 310 that includes this information and maps inodes to physical block numbers in the cylinder.

The loss or corruption of any of numerous types of metadata in a system such as that described above can result in inconsistencies or corruption of a file system of this type. For example, assume that the metadata 310 within one or more cylinders that keeps track of which blocks of storage or inodes are free and which are allocated is corrupted or lost. Without such metadata, the file system is unable to write additional files, as a determination needs to be made to identify a free inode structure and a sufficient number of free data blocks. As another example, if the metadata for a particular inode is lost or corrupted, it may not be possible to access the corresponding file. As yet a further example, the metadata in the file system can be corrupted so that two or more inodes both indicate that they own the same data block, resulting in inconsistencies regarding which inode actually does own the data block and has the ability to control and overwrite it. It should be appreciated that such corruptions or inconsistencies can develop in any of numerous ways, including hardware failures, software bugs, etc. In addition, it should be appreciated that the types of inconsistencies and problems with the file systems mentioned above are described merely for illustrative purposes, and that numerous other types of inconsistencies or problems are possible.

As mentioned above, one way to detect and correct at least some of these types of inconsistencies in a file system is by employing a file system checking utility, such as the industry standard FSCK utility or another utility that performs a similar function. For example, FSCK makes sure that no inodes share blocks if they are not supposed to, determines if there are missing data blocks, and checks to see if there are any unreferenced inodes, among other checks. However, as mentioned above, file system checking utilities like FSCK can only be executed on a static version of the file system. Thus, these utilities conventionally cannot be executed on the primary file system unless it is taken offline to prevent write activity to the file system. Applicants have appreciated that this is undesirable for a number of reason discussed above.

Accordingly, some embodiments of the present invention are directed toward maintaining a file system online for access by one or more clients while executing a file system checking utility on the file system to detect and create corrections for at least some inconsistencies in the file system. This can be done in numerous ways, as the aspect of the present invention directed to examining a file system for inconsistencies and correcting any inconsistencies while maintaining the file system online is not limited to any particular implementation technique.

In accordance with one embodiment of the present invention, inconsistencies in a file system are detected and corrected while maintaining the file system online by creating a offline copy of the file system at a particular point in time, executing a file system checking utility on the offline copy of the file system, and then updating the primary file system (i.e., the version of the file system that is maintained online) to reflect any changes made by the file system checking utility.

2. An Illustrative Technique for Creating a Static Offline Point-in-Time Version of a File System It should be appreciated that the embodiments of the present invention that relate to performing a file system checking utility on a static version of the file system at a given point in time can use any suitable technique for creating the offline version of the file system, as the aspects of the present invention described herein are not limited to employing any particular technique. In accordance with one embodiment of the present invention, the entire file system can be replicated to create a static offline copy, and a file system checking utility can be executed on the full copy of the file system.

In an alternate embodiment of the present invention, a checkpoint technique is employed to create a snapshot version of a file system at any point in time without having to replicate the entire contents of the file system. Some illustrative techniques for creating one or more snapshots of a file system (e.g., in a NAS system) to preserve the state of the file system at various points in time have been developed by the assignee of the present application and are described in U.S. Pat. Nos. 6,434,681; 6,792,518 and 6,934,822, each of which is incorporated herein by reference in its entirety. In addition, a capability for providing a version of a NAS file system at a particular point in time is provided by the Celerra snapshot checkpoint facility available from EMC Corporation. It should be appreciated that these techniques for creating a static offline version of a file system at a particular point in time are merely examples of techniques with which the aspects of the present invention described herein can be used, as embodiments of the present invention are not limited to employing these or any other techniques, and can be employed with any technique for creating a version of a file system at any particular point in time.

Figure 4:
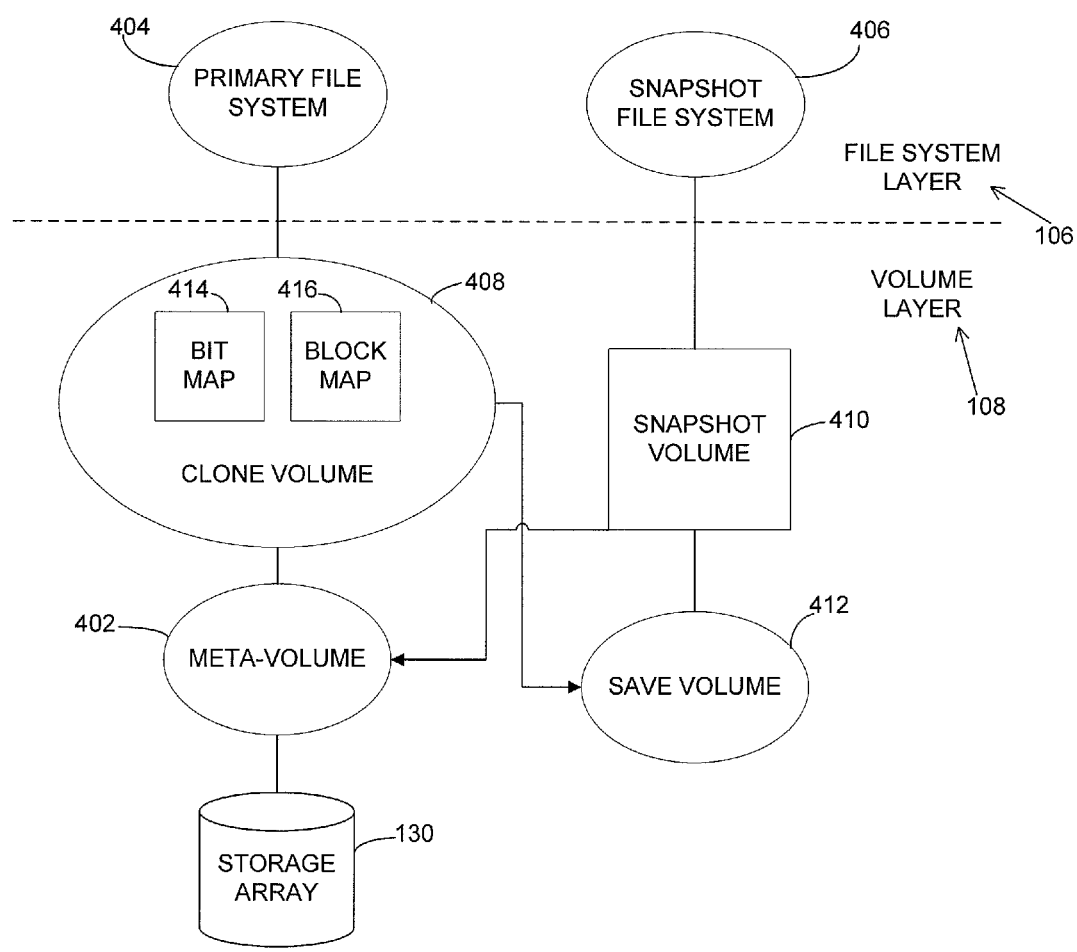
FIG. 4 shows a checkpoint facility for creating an offline read-only version of a file system for use with some embodiments of the present invention.

A description of the manner in which a checkpoint facility can be employed to create a static offline version of a file system at any point in time will now be described making reference to FIG. 4. As discussed above, in some NAS systems of the type shown in FIG. 1, the volume layer 108 can operate on one or more LUNs presented by the storage system 130 and concatenate them together to create a single volume of storage that corresponds to the storage space allocated to a file system layer 106, and that single volume of storage for the file system is referred to as a meta-volume 402 in FIG. 4. As shown in FIG. 4, the creation of a snapshot version of the file system at any particular point in time results in the file system layer 106 separately maintaining the primary file system 404 (which remains online) and a snapshot version of the file system 406. In addition to the meta-volume 402, the volume layer 108 creates three additional logical constructs to support a snapshot file system 406, i.e., a clone volume 408, a snapshot volume 410 and a save volume 412.

The clone volume 408 can logically be considered to be in the volume stack connected to the primary file system 404, and the snapshot volume 410 in the volume stack connected to the snapshot file system 406. The clone volume includes a bit map structure 414 and, a block map structure 416, and can logically be considered to have access to the save volume 412 to allow reads/writes to the save volume.

The block map 416 indicates the mapping between any data blocks in the clone volume (i.e., indicated in the bit map as being "snapped") and the particular copied blocks in the save volume wherein the content of each snapped block is stored as shown in FIG. 5.

The clone volume 408, snapshot volume 410 and save volume 412 each are created when a checkpoint or snapshot file system 406 is created. When created, the bitmap 414, block map 416 and save volume 412 all are empty. The bitmap 414 includes a bit corresponding to each of the file system blocks in the primary file system 404. When a write occurs that seeks to overwrite a block in the primary file system 404, a determination is made as to whether the bit in the bitmap 414 corresponding to that block is set, indicating that the block had previously been overwritten and therefore had been "snapped" or already saved to the save volume 412 so that it need not be saved again in a manner discussed in more detail below.

In the example of FIG. 5, three blocks in the primary file system 404 have been overwritten, i.e., blocks identified as blocks B0, B1 and B3. When those blocks are overwritten in the primary file system 404 and its corresponding meta-volume 402, the data in those blocks are saved to the save volume 412 to ensure that the entire state of the primary file system at the time that the snapshot file system 406 was created can be retrieved. Each of the blocks of the clone volume 408 can be written to any block in the save volume 412, and the block map 416 stores metadata indicating a mapping between each of the blocks in the clone volume 408 that have been copied to the save volume 412 and their corresponding blocks in the save volume 412. In the example of FIG. 5, the content of block B0 is stored in the save volume block S100, the contents of block B1 are stored in save volume block S50 and the contents of block B3 are saved to save volume S230, but it should be appreciated that any mapping between the blocks in the clone volume and the save volume is possible.

The lowest level of granularity tracked in the bitmap 414 and block map 416 is an entire block in the primary file system 404 (i.e., a unit of content corresponding to the block size of the file system). However, it should be appreciated that smaller units of information could alternatively be used to provide a smaller level of granularity tracking the size of content that is overwritten in the primary file system 404.

An example of how the checkpoint facility of the system described above in connection with FIGS. 4 and 5 handles a write to the primary file system will now be described referring to FIG. 6.

In act 600, a request is received from a client to write to block Bi in the primary file system 404. In act 602, the bit map 414 is accessed, and in act 604 it is determined whether the block Bi had previously been snapped (e.g., if the corresponding bit in the bit map is "1"). If the block Bi was already snapped, the content in the block from the snapshot version of the file system has already been stored in the save volume 412, so it need not be stored there again. Thus, the new data simply overwrites the existing data in block Bi in the clone volume 408 in act 610, and the process ends in act 612. If it is determined in act 604 that the block Bi has not previously been snapped (e.g., the corresponding bit in the bit map is "0"), the existing content of block Bi is copied from the clone volume 408 to a free block in the save volume 412 in act 606. Then in act 608, an entry is made into the block map 416 indicating the mapping of block Bi to the location in the save volume Si where the data was copied, and the bit corresponding to the block Bi in the bit map 414 is set to "1". In act 610, the new data overwrites the old data in block Bi in the meta-volume 402 and the process ends in act 612.

Figure 6:
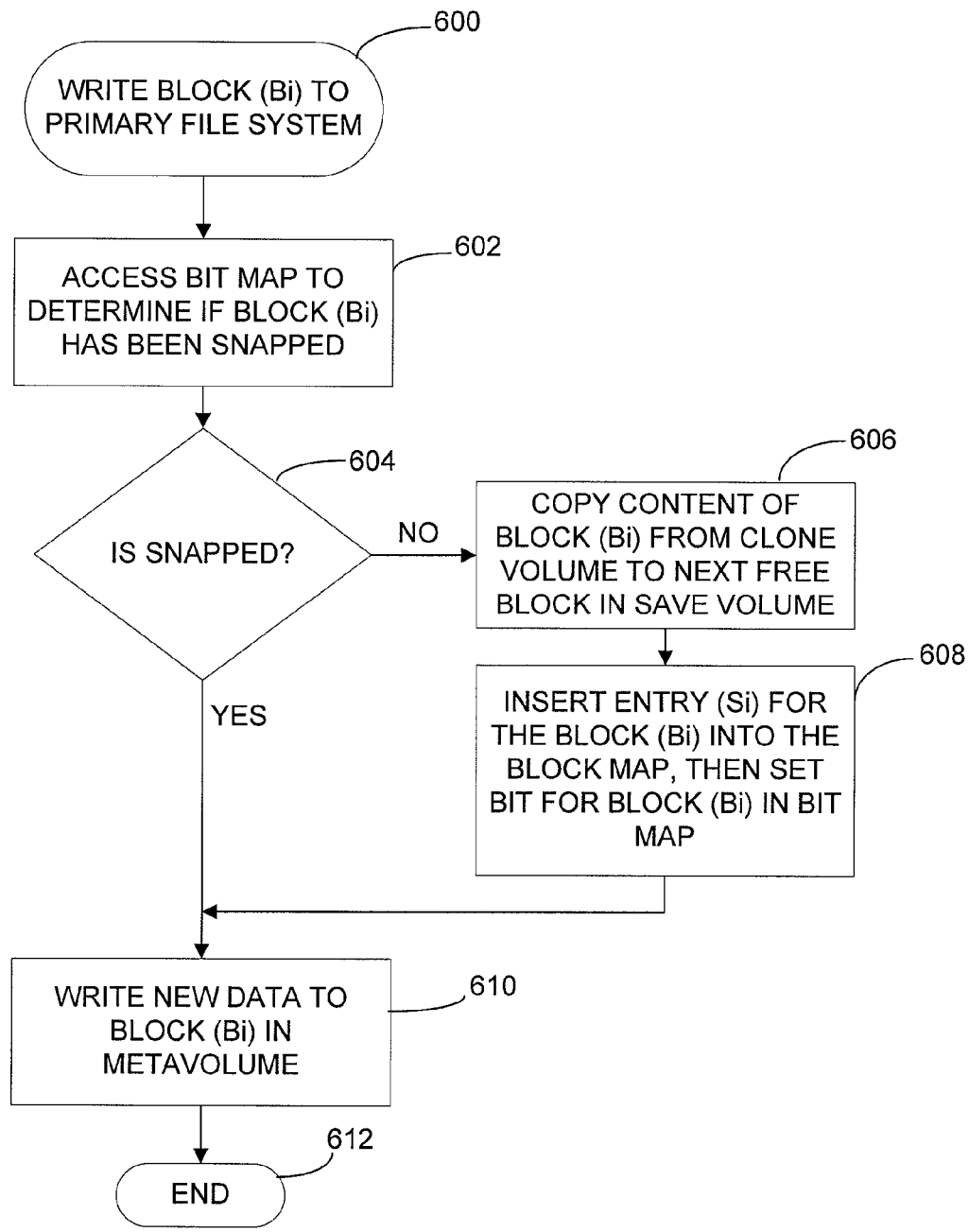
FIG. 6 is a flow chart illustrating one example of how the checkpoint facility of FIGS. 4-5 responds to a write to the primary file system.

While not shown in FIG. 6, in some implementations, an additional determination can be made to determine whether the block being written to was included in the snapshot version of the file system 406. This additional determination can be made either before act 604, or alternatively, before the content of the block is moved and the block and bitmaps are updated in acts 606 and 608. For example, if the write is directed to a block in the primary file system 404 that had not been written to at the time the snapshot version of the file system 406 was created, it is unnecessary to save whatever content is in the block that will be overwritten, for the purpose of maintaining the integrity of the snapshot version of the file system. Thus, an additional determination can be performed to avoid unnecessary copying of content to the save volume 412 and the associated updating of the bitmap 414 and block map 416 as discussed above.

Figure 7:
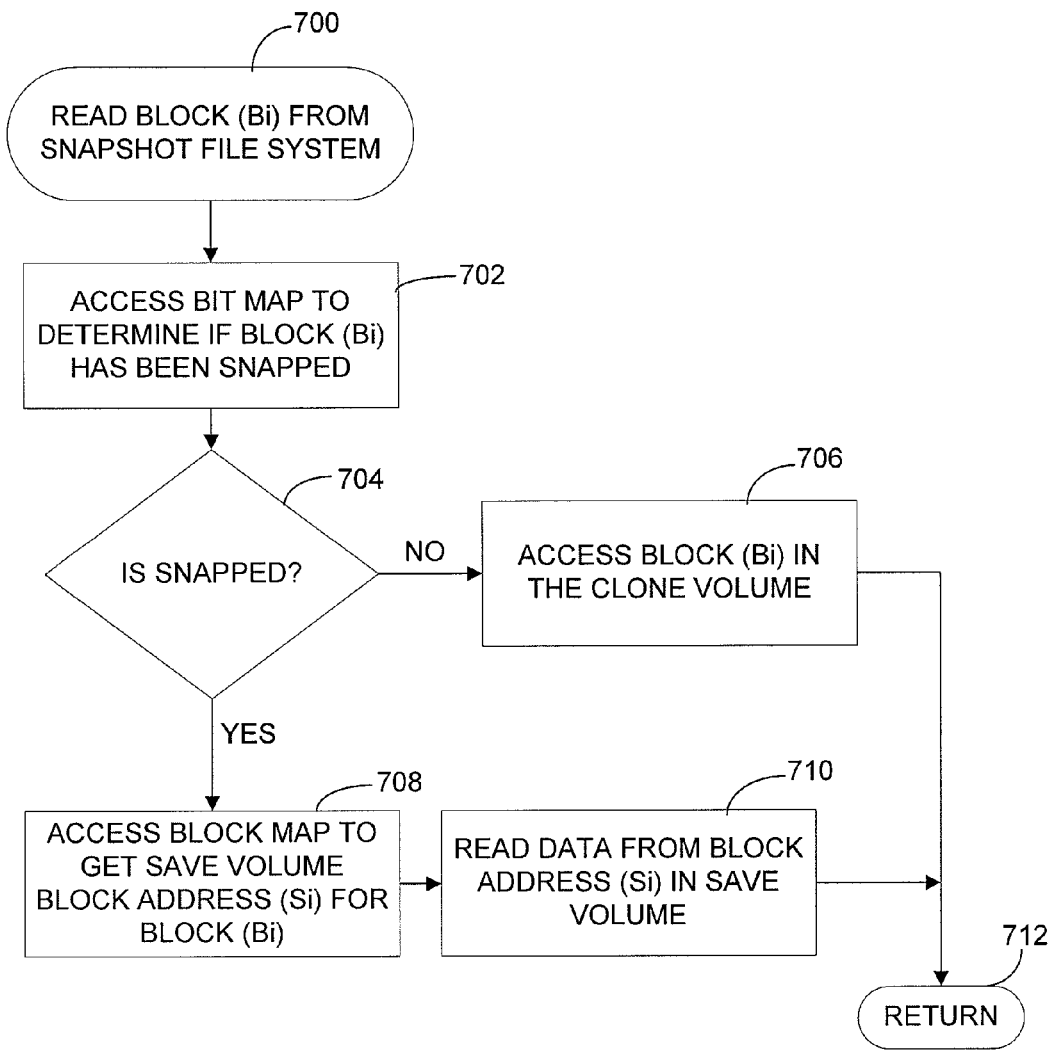
FIG. 7 is a flow chart illustrating one example of how the checkpoint facility of FIGS. 4-5 responds to a read request to a snapshot file system.

An example of a method by which the checkpoint facility described above services a read directed to the snapshot file system will now be described with reference to FIG. 7.

First, in act 700, a request is made by a client to read a block Bi from the snapshot version of the file system 406. In act 702, the bit map 414 is accessed, and in act 704 it is determined whether or not the block Bi has been snapped. If the block Bi has not been snapped, the read of block Bi is made from the clone volume 408 in act 706, the corresponding data is returned to the client, and the process terminates in act 712. It should be appreciated that the content for each block in the clone value 408 that has not been snapped corresponds precisely to the same block in the meta-volume 402 of the primary file system 404. If it is determined in act 704 that the block Bi has been snapped (e.g., by determining that the corresponding bit in the bit map is set), the block map 416 is accessed in act 708 to retrieve the save volume block address Si for the block Bi. The content of the block is then read from the block address Si in the save volume 412 in act 710, the corresponding data is returned to the client, and the process terminates in act 712.

In the example shown in FIGS. 4-7, only a single snapshot version of the file system 406 is taken at a particular point in time. However, the checkpoint facilities described above for creating a snapshot version of a file system have the capability of recursively and figuratively creating multiple snapshot versions at different points in time. When multiple snapshot versions of the file system are employed, they may share a single block map 416 to allow any content on the save volume 412 to be retrieved, but each snapshot version may include its own bitmap 414. In determining whether a block has been snapped (e.g., either to retrieve it from the save volume or to determine whether it should be written to the save volume or be overwritten) when multiple snapshot versions of the file system have been created, a determination can be made by looking not only at the bitmap 414 of the snapshot version of the file system 406 of interest, but also at the corresponding bitmaps for any snapshot versions created after the snapshot version of interest, because in some implementations, only the bitmap 414 for the most recently created snapshot version is updated when a block is overwritten and snapped to the save volume 412.

Figure 8:
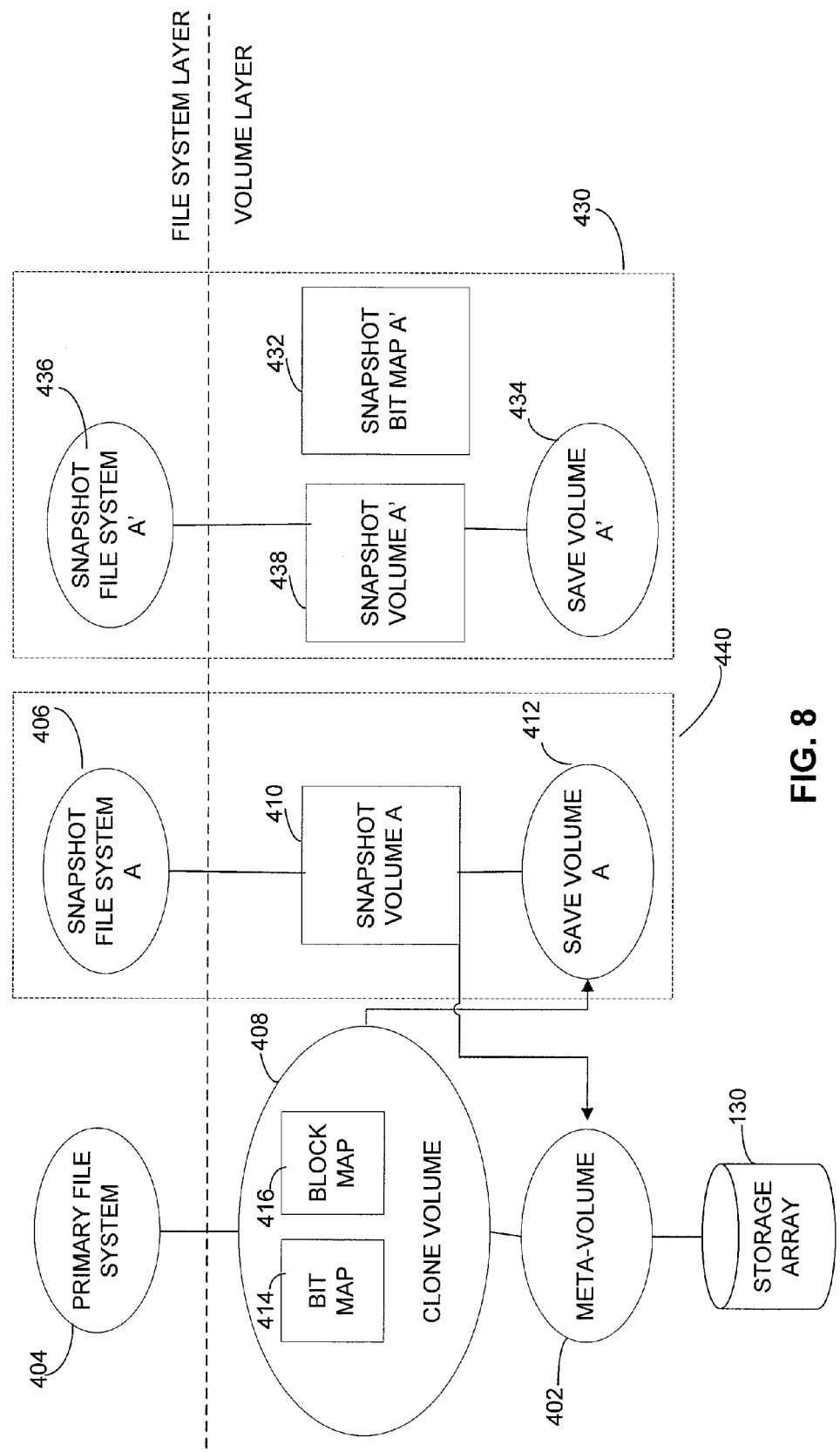
FIG. 8 shows a checkpoint facility for creating a read/write version of a file system for use with some embodiments of the present invention

The example provided above of a checkpoint facility to create a static offline snapshot of a file system described a read-only snapshot. Some checkpoint facilities for creating a snapshot of a file system of the type described above also have the capability to create a read/write snapshot as illustrated in FIG. 8. A read/write snapshot 430 is similar to the read-only snapshot 440 described above in that it can maintain a static view of the file system at a particular point in time, but read/write snapshots can also receive writes that occur subsequent to the time when the snapshot was created. Thereafter, a user can choose to read from or restore the primary file system 404 from either the static offline read-only version of the snapshot 440 or the read/write version of the snapshot 430. Reads to a read/write snapshot 430 are handled in the same manner as reads to a read-only snapshot 440 as described above. With respect to write operations, creation of a read/write snapshot 430 may involve the creation of an additional bitmap 432, and block map (not shown) that is similar in many respects to bitmap 414, but serves a somewhat different purpose. In this respect, when a write occurs to a block after the creation of the read/write snapshot, the newly written block is written to the save volume 434, and a bit is established in a read/write snapshot's bitmap 432 indicating that the block has been overwritten since the creation of the read/write snapshot 430. Thus, if a read occurs to the read/write snapshot 430 after the block has been overwritten, the read/write snapshot bitmap 432 can be examined to determine that the block being read has been overwritten and the block stored on the save volume 434 can be retrieved.

3. Performing a File System Utility Check on an Offline Copy of the File System

As discussed above, in accordance with one embodiment of the present invention, a file system checking utility can be executed on an offline version of a file system while maintaining the file system online. This can be done in any suitable manner, as this aspect of the present invention is not limited to any particular implementation technique. For example, any suitable file system checking utility can be employed, as the aspects of the present invention described herein are not limited to use with any particular type of file system checking utility. Similarly, any suitable technique for creating an offline version of a file system can be employed to create an offline copy on which the file system checking utility can be executed.

In accordance with one embodiment of the present invention, a checkpoint technique such as those described above for creating a snapshot of the file system at a particular point in time can be used to create a snapshot of the file system on which to execute a file system checking utility. This can be accomplished in any of numerous ways. For example, in accordance with one embodiment of the present invention, when it is desired to perform a file system check on a file system at a particular point in time, a snapshot can be created to establish an offline version of the file system at the desired point in time. The snapshot can be a read/write snapshot 430 that enables the file system checking utility to not only read the snapshot version of the file system, but also to write to the snapshot version to correct any inconsistencies that are discovered and should be corrected as part of the execution of the file system checking utility.

When the file system checking utility has completed its checking of the offline snapshot version 430 of the file system, the corrected file system can be restored and used to replace the primary file system. This can be done in any suitable manner. For example, in accordance with one embodiment, the offline snapshot version 440 of the file system can be employed as a baseline, and it can then be updated with the bitmap 432 for the read/write snapshot 430 created for the file system checking utility to determine which blocks of the offline snapshot version of the file system had been overwritten by the file system checking utility. Those blocks can be retrieved from the save volume 434 and be used to update the meta-volume 402 of the primary file system.

In addition, while the file system check is executing on a snapshot, clients having access to the primary file system 404 may continue to perform writes to the primary file system 404, and these changes to the primary file system since the start of the execution of the file system check on the snapshot may be recorded in any suitable way. For example, while a file system check is executing on a snapshot, an event may be generated each time a change is made to the file system, and the events may be saved to a log file. Alternatively, changes made to primary file system since the start of a file system check on a snapshot may be determined by querying the primary file system for any modifications occurring within a particular time range. For example, the time range may be from the time the file system check was initiated until the file system check was completed. It should be appreciated that modifications to the primary file system may be tracked in any suitable way, and the aforementioned methods are merely illustrative.

After the file system check on a snapshot is completed, the primary file system 404 can be updated to reflect all of the changes made by the file system checking utility, and additionally include all of the changes made by clients to the primary file system since the invocation of the file system checking utility. It should be appreciated that the process of updating the primary file system 404 to include changes made by the clients to the primary file system may be performed in any suitable way, including but not limited to the methods described above. For example, changes made by the clients may be manually merged with the changes made by the file system utility, or they may be merged using any other means.

Figure 9:
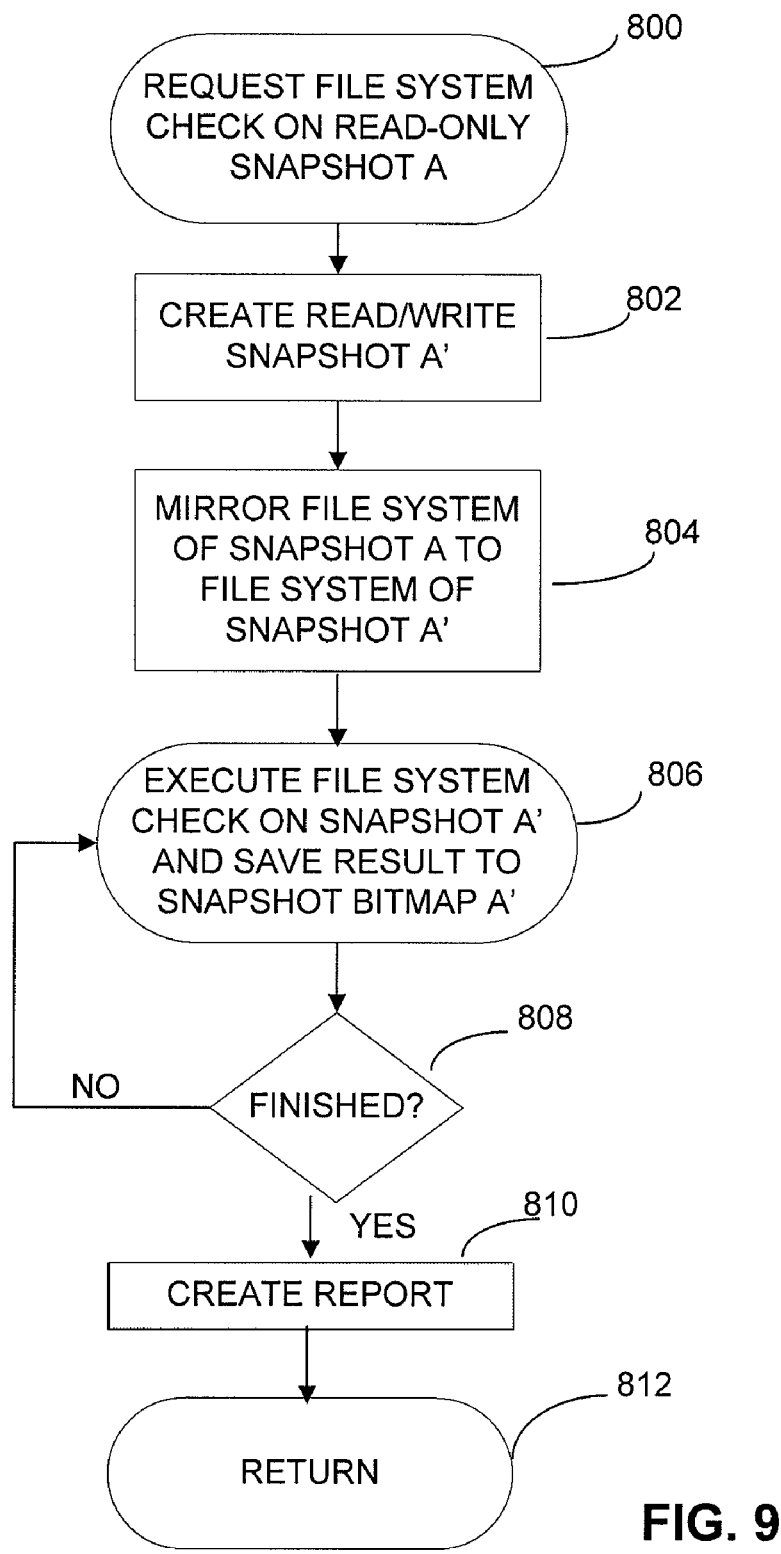
FIG. 9 is a flow chart illustrating one example of performing a file system check on a snapshot file system according to an embodiment of the present invention.

An illustrative implementation of a method for performing a file system check on a snapshot is described with reference to FIG. 9. In act 800, a request is received to perform a file system check on a read-only snapshot 440. It should be appreciated that this request may be made directly by a system administrator or any other qualified individual, or by a scheduler included as software executing on a processor (e.g., processor 125 in FIG. 1) within the storage system 120, or elsewhere in the computer system. Upon receiving the request to begin a file system check, a read/write checkpoint 430 is created in act 802, and writes to the primary file system subsequent to the start of the file system check on the snapshot 440 are tracked using any appropriate method. In act 804, the file system 406 corresponding to read-only snapshot 440 is mirrored to the newly-created file system 436 of the read/write snapshot 430, such that the file systems of the read-only snapshot 440 and the read/write snapshot 430 are synchronized. In act 806, the file system check utility is executed on the file system 436 of the read/write snapshot 430, and if inconsistencies are detected, appropriate corrections are made and the changes are saved in the snapshot bit map 432 and/or the save volume 434. In act 808, it is then determined if the file system check is complete. If the file system check is not complete, then it continues, otherwise if the file system check is complete, the process terminates in act 812. In some embodiments, a notification is sent to a system administrator or other qualified individual to let them know that the file system check has completed.

As mentioned above, according to some embodiments, after the file system check has completed, the primary file system may be updated with a snapshot file system including at least some corrections for detected inconsistencies in the file system. The update may either be automatic or manual, as the aspects of the invention described herein are not limited in this respect.

According to some embodiments of the present invention, after a file system check is executed in act 806, a report is generated in act 810 indicating any inconsistencies that were detected during the file system check and/or the corrections that were made during the file system check to correct them. The report enables a system administrator (or any other qualified individual) to decide whether to implement some or all of the corrections in the primary file system before updating the file system with the corrections.

As discussed above, given the constraint of taking a file system offline to perform a file system check in the prior art, the conventional approach to performing a file system check typically involved a reactive process in which a file system check utility was not employed to operate on a file system unless and until problems were encountered (e.g., by users), and the problems were significant enough to warrant the inconvenience and potential loss of productivity to take the file system offline. Applicants have appreciated that advantages can be achieved by employing a different paradigm for file system maintenance. Thus, in accordance with one embodiment of the present invention, the integrity of a file system is proactively and prophylactically maintained by scheduling execution of at least one file system checking utility to detect and correct at least some inconsistencies in the file system based upon a schedule, rather than in reaction to one or more file system problems being detected by a client that uses the file system, a system administrator or any other entity or individual. The schedule can be based upon any suitable criteria, as the aspect of the present invention that relates to scheduling the execution of a file system checking utility is not limited in this respect. Applicants have appreciated that by proactively and prophylactically maintaining the integrity of the file system, small problems that arise can be detected and corrected before they lead to larger and more significant problems. In addition, in accordance with some embodiments of the present invention, the schedule for performing a file system check can be established with the goal of detecting and correcting most problems before they manifest themselves in a way that is perceptible by the users (e.g., clients) of the file system.

While not limited in this respect, in accordance with one embodiment of the present invention, the aspect of the present invention that relates to proactively and prophylactically maintaining the integrity of the file system by scheduling execution of at least one file system checking utility can be combined with any of the embodiments described above that enable the file system to be maintained online while the file system checking utility is executed. It should be appreciated that employing techniques that enable the file system to remain online while a file system checking utility is executed to detect and correct any inconsistencies or problems therein provides tremendous flexibility in terms of the frequency with which a file system check can be scheduled, as doing so does not require that the file system be taken offline while the file system checking utility operates. Thus, in accordance with some embodiments of the present invention, execution of the file system checking utility can be scheduled with sufficient frequency (e.g., monthly, weekly, daily, etc.) to, in most cases, detect and correct file systems inconsistencies or problems before they manifest themselves to the users of the file system.

Figure 10:
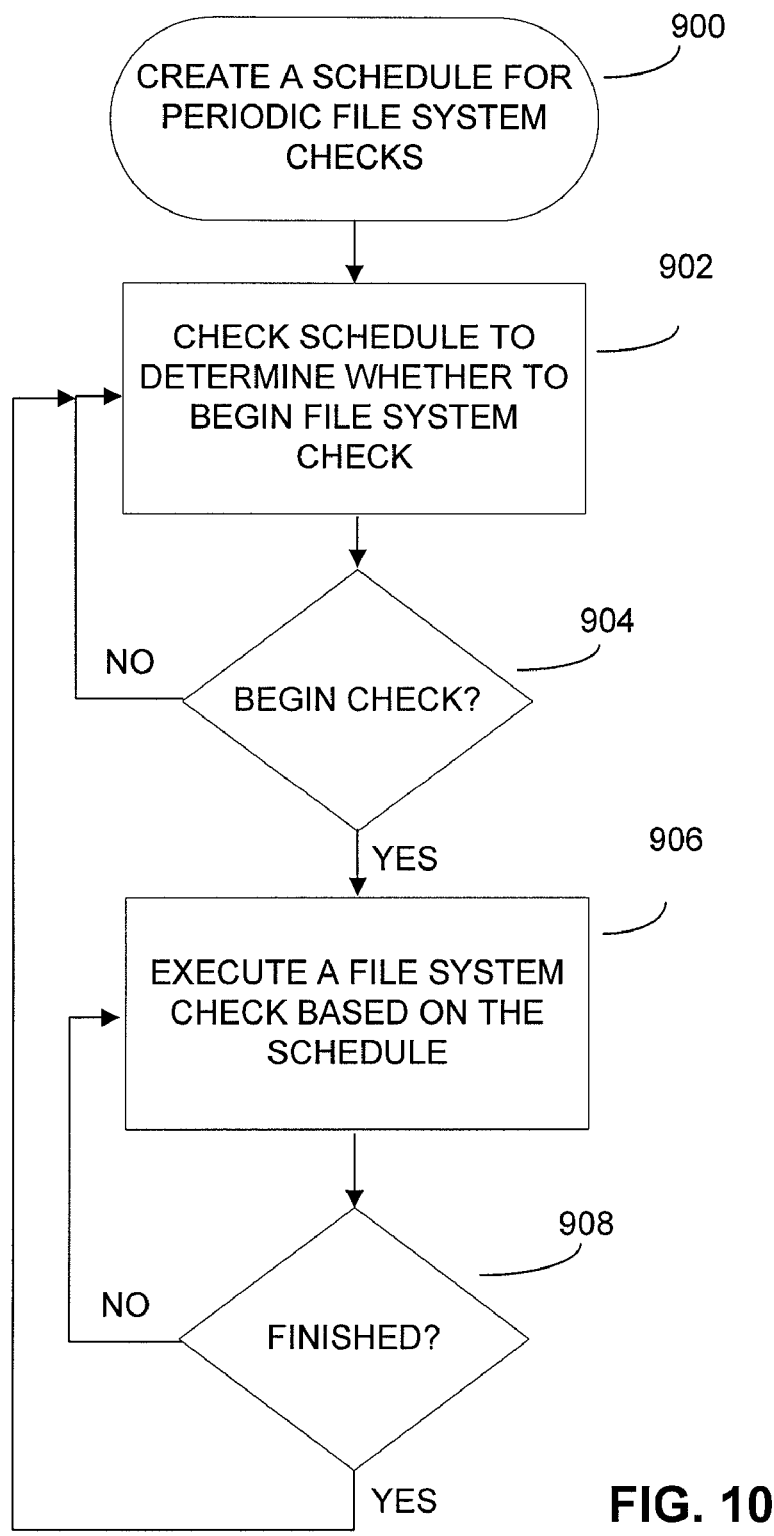
FIG. 10 is a flow chart illustrating one example of scheduling periodic file system checks on a file system according to an embodiment of the present invention.

An illustrative process for implementing an embodiment of the invention directed to proactively and prophylactically maintaining the integrity of the file system is shown in FIG. 10. In an act 900, a schedule is created (e.g., via a system administrator, any other qualified individual, or in any other suitable way) for performing periodic file system checks on a snapshot. In act 902, the schedule is consulted to determine whether a system file check should begin. The schedule may be automatically consulted, for example, by a scheduling program implemented as software running on a processor (e.g., processor 125 or some other processor), or alternatively the schedule may be consulted manually by a system administrator or any other qualified individual, as aspects of the invention related to scheduling file system checks are not limited in this respect. If it is determined in act 904 that a file system check should begin, a file system check is executed on the file system in act 906. This file system check may be executed on a snapshot of the file system according to any of the methods described above, or may be performed in any other suitable way. In act 908, if it is determined that the file system check has not completed, the file system check continues, otherwise, the schedule is consulted again in act 902 to determine the time of the next scheduled file system check, and the process repeats.

Aspects of the invention, including embodiments described above, can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of embodiments in accordance with aspects of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention. It should be appreciated that in accordance with several embodiments of the present invention wherein processes are implemented in a computer readable medium, the computer implemented processes may, during the course of their execution, receive input manually (e.g., from a user).

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of correcting at least some inconsistencies in a file system accessed by at least one client, the method comprising:
   while maintaining the file system online for access by the at least one client, executing at least one file system checking utility on the file system to detect and create corrections for at least some inconsistencies in the file system, wherein said executing the at least one file system checking utility on the file system includes:
      creating an offline version of the file system where the offline version includes data and metadata of the file system;
      executing the at least one file system checking utility on the offline version to detect inconsistencies with respect to data and metadata of the offline version; and
      writing to the offline version to correct at least some detected inconsistencies with respect to data and metadata in the offline version; and
   updating the file system to include at least some of the corrections, wherein said updating includes copying at least some of the corrections from the offline version to the file system.

2. The method of claim 1, wherein the offline version of the file system represents a state of the file system at a point in time.

3. The method of claim 2, wherein executing at least one file system checking utility on the offline version of the file system includes detecting any inconsistencies and creating corrections for at least some inconsistencies in the file system at the point in time that the offline version was created.

4. The method of claim 3, wherein creating the offline version of the file system comprises creating a snapshot of the file system at the point in time.

5. The method of claim 4, wherein creating the snapshot comprises creating a log file that tracks updates to the file system after the point in time that the snapshot is created and updates the snapshot with the at least some of the corrections created by the at least one file system checking utility; and
   wherein said updating comprises restoring the file system with at least some of the updates in the log file.

6. The method of claim 5, wherein the updates comprise updates from the at least one client, and wherein restoring the file system comprises restoring the file system to include at least some of the updates in the log file.

7. At least one non-transitory computer readable medium encoded with a plurality of instructions that, when executed, perform a method of correcting at least some inconsistencies in a file system accessed by at least one client, the method comprising:
   while maintaining the file system online for access by the at least one client, executing at least one file system checking utility on the file system to detect and create corrections for at least some inconsistencies in the file system, wherein said executing the at least one file system checking utility on the file system includes:
      creating an offline version of the file system where the offline version includes data and metadata of the file system;
      executing the at least one file system checking utility on the offline version to detect inconsistencies with respect to data and metadata of the offline version; and
      writing to the offline version to correct at least some detected inconsistencies with respect to data and metadata in the offline version; and
   updating the file system to include at least some of the corrections, wherein said updating includes copying at least some of the corrections from the offline version to the file system.

8. The at least one non-transitory computer readable medium of claim 7, wherein the offline version of the file system represents a state of the file system at a point in time.

9. The at least one non-transitory computer readable medium of claim 8, wherein executing at least one file system checking utility on the offline version of the file system includes detecting any inconsistencies and creating corrections for at least some inconsistencies in the file system at the point in time that the offline version was created.

10. The at least one non-transitory computer readable medium of claim 9, wherein creating the offline version of the file system comprises creating a snapshot of the file system at the point in time.

11. The at least one non-transitory computer readable medium of claim 10, wherein creating the snapshot comprises creating a log file that tracks updates to the file system after the point in time that the snapshot is created and updates the snapshot with the at least some of the corrections created by the at least one file system checking utility; and
   wherein said updating comprises restoring the file system with at least some of the updates in the log file.

12. The at least one non-transitory computer readable medium of claim 11, wherein the updates comprise updates from the at least one client, and wherein restoring the file system comprises restoring the file system to include at least some of the updates in the log file.

13. At least one computer included in a computer system comprising a file system accessed by at least one client, the at least one computer comprising:
   at least one processor programmed to:
      while maintaining the file system online for access by the at least one client, execute at least one file system checking utility on the file system to detect and create corrections for at least some inconsistencies in the file system, wherein executing at least one file system checking utility on the file system includes:
         creating an offline version of the file system where the offline version includes data and metadata of the file system;
         executing the at least one file system checking utility on the offline version to detect inconsistencies with respect to data and metadata of the offline version; and
         writing to the offline version to correct at least some detected inconsistencies with respect to data and metadata in the offline version; and
      update the file system to include at least some of the corrections, wherein updating the file system to include at least some of the corrections includes copying at least some of the corrections from the offline version to the file system.

14. The at least one computer of claim 13, wherein the at least one processor is further programmed to update the file system to include at least some of the corrections while continuing to maintain the file system online for access by the at least one client.

15. The at least one computer of claim 13, wherein the offline version of the file system represents a state of the file system at a point in time.

16. The at least one computer of claim 15, wherein executing at least one file system checking utility on the offline version of the file system includes detecting any inconsistencies and creating corrections for at least some inconsistencies in the file system at the point in time that the offline version was created.

17. The at least one computer of claim 16, wherein at least one processor is programmed to create the offline version of the file system by creating a snapshot of the file system at the point in time.

18. The at least one computer of claim 17, wherein the at least one processor is programmed to create a log file that tracks updates to the file system after the point in time that the snapshot is created and updates the snapshot with the at least some of the corrections created by the at least one file system checking utility and wherein updating the file system includes restoring the file system with at least some of the updates in the log file.

19. The at least one computer of claim 18, wherein the updates comprise updates from the at least one client, and wherein restoring the file system comprises restoring the file system to include at least some of the updates in the log file.

20. The at least one computer of claim 13, wherein the at least one computer is a file system server that manages the file system and provides the file system as an interface to at least one storage system.

21. A method for use in a computer system comprising a file system accessed by at least one client, the method comprising:
while maintaining the file system online for access by the at least one client, executing at least one file system checking utility on the file system to detect at least some inconsistencies in the file system and to create a corrected version of the file system that includes at least some corrections to correct for at least some of the detected inconsistencies, wherein said executing the at least one file system checking utility on the file system includes:
creating an offline version of the file system where the offline version includes data and metadata of the file system;
executing the at least one file system checking utility on the offline version to detect inconsistencies with respect to data and metadata of the offline version; and
writing to the offline version to correct at least some detected inconsistencies with respect to data and metadata in the offline version;
creating a report that identifies the proposed corrections in the corrected version of the file system; and
refraining from automatically updating the file system with the corrected version unless the proposed corrections are approved, wherein upon approval, updating the file system with the corrected version wherein said updating includes copying at least some of the proposed corrections from the offline version to the file system.

22. The method of claim 21, further comprising:
updating the file system with at least some of the proposed corrections in response to an indication from at least one user that the at least some of the proposed corrections are approved.

23. The method of claim 21, wherein said creating a report comprises maintaining the file system online for access by the at least one client while generating the report.

24. The method of claim 23, wherein the offline version of the file system represents a state of the file system at a point in time and executing at least one file system checking utility on the offline version of the file system includes detecting any inconsistencies and creating corrections for at least some inconsistencies in the file system at the point in time that the offline version was created.

25. The method of claim 24, wherein creating the offline version of the file system comprises creating a snapshot of the file system at the point in time.

26. The method of claim 25, wherein creating the snapshot comprises creating a log file that tracks updates to the file system after the point in time that the snapshot is created and updates the snapshot with the at least some of the corrections created by the at least one file system checking utility.

27. The method of claim 21, wherein said executing at least one file system checking utility on the file system and said creating a report are performed periodically according to a schedule and are not in response to one or more file system problems being detected by the at least one client.

28. At least one non-transitory computer readable medium encoded with a plurality of instructions that, when executed, perform a method for use in a computer system comprising a file system accessed by at least one client, the method comprising:
while maintaining the file system online for access by the at least one client, executing at least one file system checking utility on the file system to detect at least some inconsistencies in the file system and to create a corrected version of the file system that includes at least some corrections to correct for at least some of the detected inconsistencies, wherein said executing the at least one file system checking utility on the file system includes:
creating an offline version of the file system where the offline version includes data and metadata of the file system;
executing the at least one file system checking utility on the offline version to detect inconsistencies with respect to data and metadata of the offline version; and
writing to the offline version to correct at least some detected inconsistencies with respect to data and metadata in the offline version;
creating a report that identifies the proposed corrections in the corrected version of the file system; and
refraining from automatically updating the file system with the corrected version unless the proposed corrections are approved, wherein upon approval, updating the file system with the corrected version wherein said updating includes copying at least some of the proposed corrections from the offline version to the file system.

29. The at least one non-transitory computer readable medium of claim 28, wherein the method further comprising:
updating the file system with at least some of the proposed corrections in response to an indication from at least one user that the at least some of the proposed corrections are approved.

30. The at least one non-transitory computer readable medium of claim 28, wherein said creating a report comprises maintaining the file system online for access by the at least one client while generating the report.

31. The at least one non-transitory computer readable medium of claim 30, wherein the offline version of the file system represents a state of the file system at a point in time and executing at least one file system checking utility on the offline version of the file system includes detecting any inconsistencies and creating corrections for at least some inconsistencies in the file system at the point in time that the offline version was created.

32. The at least one non-transitory computer readable medium of claim 31, wherein creating the offline version of the file system comprises creating a log file that tracks updates to the file system after the point in time that a snapshot is created and updates the snapshot with the at least some of the corrections created by the at least one file system checking utility.

33. The at least one non-transitory computer readable medium of claim 28, wherein said executing at least one file system checking utility on the file system ad said creating a report are performed periodically according to a schedule and not in response to one or more file system problems being detected by the at least one client.

34. At least one computer included in a computer system comprising a file system accessed by at least one client, the at least one computer comprising:
  at least one processor programmed to:
    while maintaining the file system online for access by the at least one client, execute at least one file system checking utility on the file system to detect at least some inconsistencies in the file system and to create a corrected version of the file system that includes at least some corrections to correct for at least some of the detected inconsistencies, wherein executing at least one file system checking utility on the file system includes:
      creating an offline version of the file system where the offline version includes data and metadata of the file system;
      executing the at least one file system checking utility on the offline version to detect inconsistencies with respect to data and metadata of the offline version; and
      writing to the offline version to correct at least some detected inconsistencies with respect to data and metadata in the offline version;
    create a report that identifies the proposed corrections in the corrected version of the file system; and
    refrain from automatically updating the file system with the corrected version unless the proposed corrections are approved, wherein upon approval, updating the file system with the corrected version wherein said updating includes copying at least some of the proposed corrections from the offline version to the file system.

35. The at least one computer of claim 34, wherein the at least one processor is further programmed to update the file system with at least some of the proposed corrections in response to an indication from at least one user that the at least some of the proposed corrections are approved.

36. The at least one computer of claim 34, wherein the at least one processor is programmed to maintain the file system online for access by the at least one client while generating the report.

37. The at least one computer of claim 36, wherein the offline version of the file system represents a state of the file system at a point in time and executing at least one file system checking utility on the offline version of the file system includes detecting any inconsistencies and creating corrections for at least some inconsistencies in the file system at the point in time that the offline version was created.

38. The at least one computer of claim 37, wherein the at least one processor is programmed to create the offline version of the file system by creating a snapshot of the file system at the point in time.

39. The at least one computer of claim 38, wherein the at least one processor is programmed to create a log file that tracks updates to the file system after the point in time that the snapshot is created and updates the snapshot with the at least some of the corrections created by the at least one file system checking utility.

40. The at least one computer of claim 34, wherein the at least one processor is programmed to the execute the file system checking utility and to create the report periodically according to a schedule and not in response to one or more file system problems being detected by the at least one client.

41. The at least one computer of claim 34, wherein the at least one computer is a file system server that manages the file system and provides the file system as an interface to at least one storage system.

42. A method of proactively and prophylactically maintaining integrity of a file system accessed by at least one client, the method comprising:
  scheduling execution of at least one file system checking utility to detect and correct at least some inconsistencies in the file system based upon a schedule that is selected to periodically check the integrity of the file system and correct at least one inconsistency so that the at least one file system checking utility is executed not in response to one or more file system problems being detected by the at least one client;
  executing the at least one file system checking utility according to the schedule while maintaining the file system online for access by the at least one client, wherein said executing the at least one file system checking utility according to the schedule includes:
    creating an offline version of the file system where the offline version includes data and metadata of the file system;
    executing the at least one file system checking utility on the offline version to detect inconsistencies with respect to the data and metadata of the offline version; and
    writing to the offline version to correct at least some detected inconsistencies with respect to the data and metadata in the offline version; and
  updating the file system to include at least one correction for at least one inconsistency detected by the at least one file system checking utility, wherein updating the file system to include the at least one correction includes copying the at least one correction from the offline version to the file system.

43. The method of claim 42, wherein said scheduling comprises scheduling execution of the at least one file system checking utility based on a schedule that is designed to detect and correct at least some inconsistencies in the file system before they become apparent to the at least one client.

44. The method of claim 42, wherein said offline version of the file system represents a state of the file system at a point in time; and executing the at least one file system checking utility on the offline version of the file system includes detecting any inconsistencies and creating corrections for at least some inconsistencies in the file system at the point in time that the offline version was created.

45. The method of claim 44, wherein creating an offline version of the file system comprises creating a log file that tracks updates to the file system after the point in time that the snapshot is created and updates the snapshot with at least some of the corrections created by the at least one file system checking utility; and
  wherein the method further comprises, when the at least some of the corrections are created based upon a scheduled execution of the at least one file system checking utility, restoring the file system with at least some of the updates in the log file.

46. The method of claim 42, further comprising, for each scheduled execution of the at least one file system checking utility, performing processing including:

creating a report that identifies proposed corrections to the at least one file system detected by the scheduled execution of the at least one file system checking utility; and refraining from automatically updating the file system with the proposed corrections unless the proposed corrections are approved.

47. The method of claim 46, further comprising:

updating the file system with at least some of the proposed corrections in response to an indication from at least one user that the at least some of the proposed corrections are approved.

48. At least one non-transitory computer readable medium encoded with a plurality of instructions that, when executed, perform a method of proactively and prophylactically maintaining integrity of a file system accessed by at least one client, the method comprising:

scheduling execution of at least one file system checking utility to detect and correct at least some inconsistencies in the file system based upon a schedule that is selected to periodically check the integrity of the file system and correct at least one inconsistency so that the at least one file system checking utility is executed not in response to one or more file system problems being detected by the at least one client;

executing the at least one file system checking utility according to the schedule while maintaining the file system online for access by the at least one client, wherein said executing the at least one file system checking utility according to the schedule includes:

creating an offline version of the file system where the offline version includes data and metadata of the file system;

executing the at least one file system checking utility on the offline version to detect inconsistencies with respect to data and metadata of the offline version; and writing to the offline version to correct at least some detected inconsistencies with respect to data and metadata in the offline version; and updating the file system to include at least one correction for at least one inconsistency detected by the at least one file system checking utility, wherein updating the file system to include the at least one correction includes copying the at least one correction from the offline version to the file system.

49. The at least one non-transitory computer readable medium of claim 48, where said scheduling comprises scheduling execution of the at least one file system checking utility based on a schedule that is designed to detect and correct at least some inconsistencies in the file system before they become apparent to the at least one client.

50. The at least one non-transitory computer readable medium of claim 48 wherein said wherein said offline version of the file system represents a state of the file system at a point in time; and executing the at least one file system checking utility on the offline version of the file system includes detecting any inconsistencies and creating corrections for at least some inconsistencies in the file system at the point in time that the offline version was created.

51. The at least one non-transitory computer readable medium of claim 50, wherein creating an offline version of the file system comprises creating a log file that tracks updates to the file system after the point in time that the snapshot is created and updates the snapshot with at least some of the corrections created by the at least one file system checking utility; and wherein the method further comprises, when the at least some of the corrections are created based upon a scheduled execution of the at least one file system checking utility, restoring the file system with at least some of the updates in the log file.

52. The at least one non-transitory computer readable medium of claim 48, wherein the method further comprises, for each scheduled execution of the at least one file system checking utility, performing processing including:

creating a report that identifies proposed corrections to the at least one file system detected by the scheduled execution of the at least one file system checking utility; and refraining from automatically updating the file system with the proposed corrections unless the proposed corrections are approved.

53. The at least one non-transitory computer readable medium of claim 52, wherein the method further comprises:

updating the file system with at least some of the proposed corrections in response to an indication from at least one user that the at least some of the proposed corrections are approved.

54. At least one computer included in a computer system comprising a file system accessed by at least one client, the at least one computer comprising:

at least one processor programmed to proactively and prophylactically maintain integrity of the file system by scheduling execution of at least one file system checking utility to detect and correct at least some inconsistencies in the file system based upon a schedule that is selected to periodically check the integrity of the file system and correct at least one inconsistency so that the at least one file system checking utility is executed not in response to one or more file system problems being detected by the at least one client;

wherein the at least one processor is programmed to execute the at least one file system checking utility according to the schedule while maintaining the file system online for access by the at least one client, wherein when the at least one processor is programmed to execute the at least one file system checking utility according to the schedule, the at least one processor is programmed to create an offline version of the file system where the offline version includes data and metadata of the file system;

execute the at least one file system checking utility on the offline version to detect inconsistencies with respect to data and metadata of the offline version; and write to the offline version to correct at least some detected inconsistencies with respect to data and metadata in the offline version; and wherein the at least one processor is further programmed to update the file system to include at least one correction for at least one inconsistency detected by the at least one file system checking utility, wherein updating the file system to include the at least one correction includes copying the at least one correction from the offline version to the file system.

55. The at least one computer of claim 54, wherein the at least one processor is programmed to schedule execution of the at least one file system checking utility based on a schedule that is designed to detect and correct at least some inconsistencies in the file system before they become apparent to the at least one client.

56. The at least one computer of claim 54, wherein said offline version of the file system represents a state of the file system at a point in time and wherein when the at least one processor is programmed to execute the at least one file system checking utility on the offline version of the file system, the at least one processor is programmed to detect any inconsistencies and create corrections for at least some inconsistencies in the file system at the point in time that the offline version was created.

57. The at least one computer of claim 56, wherein the at least one processor is programmed to create a log file that tracks updates to the file system after the point in time that the snapshot is created and updates the snapshot with at least some of the corrections created by the at least one file system checking utility; and wherein the at least one processor is further programmed to, when the at least some of the corrections are created based upon a scheduled execution of the at least one file system checking utility, restore the file system with at least some of the updates in the log file.

58. The at least one computer of claim 54, wherein the at least one processor is programmed to, for each scheduled execution of the at least one file system checking utility:

create a report that identifies proposed corrections to the at least one file system detected by the scheduled execution of the at least one file system checking utility; and refrain from automatically updating the file system with the proposed corrections unless the proposed corrections are approved.

59. The at least one computer of claim 58, wherein the at least one processor is further programmed to update the file system with at least some of the proposed corrections in response to an indication from at least one user that the at least some of the proposed corrections are approved.

* * * * *